US011168597B2

(12) United States Patent
Fukuda

(10) Patent No.: US 11,168,597 B2
(45) Date of Patent: Nov. 9, 2021

(54) EXHAUST GAS PURIFICATION SYSTEM FOR A HYBRID VEHICLE

(71) Applicant: TOYOTA JIDOSHA KABUSHIKI KAISHA, Toyota (JP)

(72) Inventor: Koichiro Fukuda, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 16/248,865

(22) Filed: Jan. 16, 2019

(65) Prior Publication Data

US 2019/0226373 A1 Jul. 25, 2019

(30) Foreign Application Priority Data

Jan. 24, 2018 (JP) .............................. JP2018-009533

(51) Int. Cl.
*F01N 3/20* (2006.01)
*B01D 53/94* (2006.01)
(Continued)

(52) U.S. Cl.
CPC ......... *F01N 3/206* (2013.01); *B01D 53/9422* (2013.01); *B01D 53/9495* (2013.01);
(Continued)

(58) Field of Classification Search
CPC .... F01N 3/206; F01N 3/0871; F01N 2610/03; F01N 2590/11; F01N 2900/104; F01N 3/0814; F01N 3/0842; F01N 9/00; F01N 2900/08; F01N 3/36; B60W 20/16; B60W 20/00; B60W 10/08; B60W 10/06; B60W 2510/244; B60W 2710/06; B60W 2710/08; B60W 2510/0638; B01D 53/9422;
(Continued)

(56) References Cited

U.S. PATENT DOCUMENTS

2007/0205029 A1* 9/2007 Leone .................. B60W 20/15
180/65.225
2018/0281774 A1 10/2018 Fukuda

FOREIGN PATENT DOCUMENTS

EP 3 381 756 A 10/2018
JP 2006-112311 4/2006
(Continued)

*Primary Examiner* — Brian P Sweeney
(74) *Attorney, Agent, or Firm* — Oblon, McClelland, Maier & Neustadt, L.L.P.

(57) ABSTRACT

In a hybrid vehicle, suppression of an amount of fuel consumed for reducing NOx stored in an NSR catalyst and suppression of deterioration in exhaust gas components due to unreacted fuel flowing out from the NSR catalyst are made compatible with each other. Predetermined power source control is carried out in accompany with the execution of NOx reduction processing to supply fuel to the NSR catalyst. In the predetermined power source control, an engine rotation speed of an internal combustion engine is made to decrease or an operation of the internal combustion engine is made to stop, and an electric motor is controlled so as to compensate for required torque. Further, during a period of execution of the predetermined power source control, a lower limit value of a predetermined target SOC range for an SOC of a battery is changed to a value smaller than at times other than the period of execution of the predetermined power source control.

3 Claims, 4 Drawing Sheets

(51) Int. Cl.
*F01N 9/00* (2006.01)
*B60K 6/22* (2007.10)
*B60W 20/00* (2016.01)
*B60W 10/06* (2006.01)
*B60W 10/08* (2006.01)
*F01N 3/08* (2006.01)
*F02D 41/02* (2006.01)
*F02D 41/04* (2006.01)
*B60W 20/16* (2016.01)

(52) U.S. Cl.
CPC ............. *B60K 6/22* (2013.01); *B60W 10/06* (2013.01); *B60W 10/08* (2013.01); *B60W 20/00* (2013.01); *B60W 20/16* (2016.01); *F01N 3/0814* (2013.01); *F01N 3/0842* (2013.01); *F01N 3/0871* (2013.01); *F01N 9/00* (2013.01); *F02D 41/0275* (2013.01); *F02D 41/042* (2013.01); *B60W 2510/244* (2013.01); *B60W 2710/06* (2013.01); *B60W 2710/08* (2013.01); *B60Y 2200/92* (2013.01); *F01N 2590/11* (2013.01); *F01N 2610/03* (2013.01); *F01N 2900/08* (2013.01); *F01N 2900/104* (2013.01); *F02D 2200/0806* (2013.01)

(58) Field of Classification Search
CPC ...... B01D 53/9495; B60K 6/22; B60K 6/445; F02D 2200/0806; F02D 41/0275; F02D 41/042; F02D 41/405; F02D 29/06; F02D 31/001; F02D 17/04; B60Y 2200/92; Y02T 10/40; Y02T 10/62; Y02T 10/12
See application file for complete search history.

(56) References Cited

FOREIGN PATENT DOCUMENTS

| | | | |
|---|---|---|---|
| JP | 2006-194170 A | | 7/2006 |
| JP | 2017-73915 A | | 4/2017 |
| JP | 2018-168725 A | | 11/2018 |
| JP | 2019-048580 A | * | 3/2019 ............. Y02A 50/20 |

* cited by examiner

EXHAUST GAS PURIFICATION SYSTEM FOR A HYBRID VEHICLE This application claims the benefit of Japanese Patent Application No. 2018-009533, filed on Jan. 24, 2018, which is hereby incorporated by reference herein in its entirety.

BACKGROUND

Technical Field

The present disclosure relates to an exhaust gas purification system for a hybrid vehicle.

Description of the Related Art

There has been known a technique in which an NOx storage reduction catalyst (hereinafter, sometimes also referred to as an "NSR catalyst") is arranged as an exhaust gas purification catalyst in an exhaust passage of an internal combustion engine performing lean burn operation in which the engine is operated at an air fuel ratio of a mixture higher than a stoichiometric air fuel ratio. The NSR catalyst has a function to store NOx in exhaust gas when the air fuel ratio thereof in the NSR catalyst is a lean air fuel ratio higher than the stoichiometric air fuel ratio, as well as to release and reduce the NOx thus stored when the air fuel ratio in the NSR catalyst is a rich air fuel ratio lower than the stoichiometric air fuel ratio and when a reducing agent exists.

Such an NSR catalyst is also applied to a hybrid vehicle which has an internal combustion engine and an electric motor as sources of power. In patent literature 1, there is disclosed a technique for reducing NOx stored in an NSR catalyst which is arranged in an exhaust passage of an internal combustion engine mounted in a hybrid vehicle. In the technique described in this patent literature, when reducing the NOx stored in the NSR catalyst, the engine rotation speed of the internal combustion engine is made to decrease, or the operation of the internal combustion engine is made to stop, after supplying fuel as a reducing agent to the NSR catalyst. Then, required torque is compensated by driving an electric motor. According to such a technique, after fuel is supplied to the NSR catalyst, the flow rate of the exhaust gas flowing into the NSR catalyst decreases, or new exhaust gas stops flowing into the NSR catalyst. As a result, an amount of oxygen to be supplied to the NSR catalyst decreases in comparison with the case where the internal combustion engine is in a normal operation, and further, an amount of heat to be carried away by the exhaust gas also decreases in comparison with the case where the internal combustion engine is in a normal operation. Therefore, it becomes possible to reduce the NOx stored in the NSR catalyst in a more efficient manner. Accordingly, an amount of fuel to be consumed in order to reduce the NOx stored in the NSR catalyst can be decreased.

CITATION LIST

Patent Literature

Patent Literature 1: Japanese patent application laid-open publication No. 2006-112311

SUMMARY

As described above, in the construction in which the NSR catalyst is arranged in the exhaust passage of the internal combustion engine mounted on the hybrid vehicle, in cases where the engine rotation speed of the internal combustion engine is made to decrease or the operation of the internal combustion engine is made to stop, in accompany with the execution of NOx reduction processing to reduce the NOx stored in the NSR catalyst by supplying fuel to the NSR catalyst, it is necessary to adjust an output of the electric motor in order to compensate for the required torque according to an opening degree of an accelerator. In other words, the ratio of the output of the electric motor with respect to the required torque is made to increase than in normal operation. In that case, the amount of electric power (electric energy) of a battery consumed for driving the electric motor increases, so the state of charge (hereinafter, sometimes also referred to as an "SOC") of the battery decreases.

Here, in the hybrid vehicle, a predetermined target SOC range is set with respect to the SOC of the battery. Then, power generation by a generator is carried out so that the SOC of the battery is maintained in the predetermined target SOC range. For that reason, even after decreasing the engine rotation speed or stopping the operation of the internal combustion engine as well as adjusting the output of the electric motor for compensating for the required torque, when the SOC of the battery becomes lower than a lower limit value of the target SOC range, the driving of the electric motor is stopped irrespective of the progress situation of the reduction of NOx in the NSR catalyst at that point in time. Then, by controlling the operating state of the internal combustion engine, the generator is made to generate electricity, and the required torque is compensated for only by the internal combustion engine. In that case, when the engine rotation speed of the internal combustion engine has been made to decrease, it becomes necessary to raise the engine rotation speed irrespective of the progress situation of the reduction of NOx in the NSR catalyst. In addition, when the operation of the internal combustion engine has been stopped, the operation of the internal combustion engine is resumed irrespective of the progress situation of the reduction of NOx in the NSR catalyst.

At this time, in cases where the reduction of NOx in the NSR catalyst is not completed at the time when the SOC of the battery reaches the lower limit value of the target SOC range, the engine rotation speed of the internal combustion engine rises, or the operation of the internal combustion engine is resumed, in a state where fuel components having not yet been consumed by the reduction of NOx (hereinafter, sometimes also referred to as "unreacted fuel") exists in the NSR catalyst. As a result, there is a fear that the unreacted fuel may flow out from the NSR catalyst. In this case, deterioration in exhaust gas components will be caused.

The present disclosure has been made in view of the problems as mentioned above, and has for its object to provide a technique in which in a hybrid vehicle having, as sources of power for a vehicle, an internal combustion engine performing lean burn operation and an electric motor, suppression of an amount of fuel consumed for reducing NOx stored in an NSR catalyst and suppression of deterioration in exhaust gas components due to unreacted fuel flowing out from the NSR catalyst can be compatibly achieved, in cases where the NSR catalyst is arranged in an exhaust passage of the internal combustion engine.

In the present disclosure, predetermined power source control may be carried out in accompany with the execution of NOx reduction processing which supplies fuel to the NSR catalyst. In the predetermined power source control, the engine rotation speed of the internal combustion engine is made to decrease or the operation of the internal combustion engine is made to stop, and the electric motor is controlled so as to compensate for required torque. Moreover, during a period of execution of the predetermined power source control, a lower limit value of the predetermined target SOC range for the SOC of the battery may be changed to a value smaller than at times other than the period of execution of the predetermined power source control.

More specifically, according to the present disclosure, there is provided an exhaust gas purification system for a hybrid vehicle which has, as sources of power, an internal combustion engine performing lean burn operation and an electric motor, and which includes: a generator for generating electricity by power outputted from said internal combustion engine; a battery that is charged by electric power generated by said generator, and supplies the electric power to said electric motor; and a control unit configured to control an operating state of said internal combustion engine and a driving state of said electric motor. Said exhaust gas purification system comprises: an NOx storage reduction catalyst that is arranged in an exhaust passage of said internal combustion engine; wherein said control unit carries out NOx reduction processing to reduce NOx stored in said NOx storage reduction catalyst by supplying fuel as a reducing agent to said NOx storage reduction catalyst when a predetermined NOx reduction execution condition is satisfied; and said control unit obtains a state of charge of said battery; wherein said control unit may control said generator to generate electricity by controlling the operating state of said internal combustion engine so that the state of charge of said battery is maintained within a predetermined target SOC range; said control unit may perform predetermined power source control, in which an engine rotation speed of said internal combustion engine is made to decrease, or an operation of said internal combustion engine is made to stop, and performs predetermined power source control to control said electric motor is controlled so as to compensate for required torque, in accompany with the execution of said NOx reduction processing; and further, during a period of execution of said predetermined power source control, said control unit may change a lower limit value of said predetermined target SOC range to a value smaller than at times other than the period of execution of said predetermined power source control.

In the hybrid vehicle according to the present disclosure, when driving the electric motor, electric power is supplied to the electric motor from the battery. This battery is charged by the electric power generated by the generator. In addition, this generator generates electricity by the power outputted by the internal combustion engine. In addition, in the hybrid vehicle, the predetermined target SOC range is set with respect to the SOC of the battery. Then, the control unit controls the generator to generate electricity by controlling the operating state of said internal combustion engine so that the SOC of the battery is maintained within the predetermined target SOC range.

Further, accompanying the execution of the NOx reduction processing, the control unit carries out the predetermined power source control in which the engine rotation speed of the internal combustion engine is made to decrease or the operation of the internal combustion engine is made to stop, and the electric motor is controlled so as to compensate for the required torque. Here, note that when carrying out the predetermined power source control in accompany with the execution of the NOx reduction processing, the decrease of the engine rotation speed of the internal combustion engine or the stop of the operation thereof may be carried out, after the supply of fuel to the NSR catalyst is carried out. In addition, the supply of fuel to the NSR catalyst may be carried out after the decrease of the engine rotation speed of the internal combustion engine is carried out. Moreover, in cases where fuel is supplied to the NSR catalyst by a fuel addition valve arranged at the immediate upstream side of the NSR catalyst, the supply of fuel to the NSR catalyst may be carried out after the stop of operation of the internal combustion engine is carried out.

Then, at this time, during the period of execution of said predetermined power source control, the control unit changes the lower limit value of the predetermined target SOC range to the value smaller than at times other than the period of execution of the predetermined power source control. According to this, even if the electric power of the battery is consumed by the electric motor being controlled so as to compensate for the required torque during the period of execution of the predetermined power source control, it becomes difficult for the SOC of the battery to reach the lower limit value of the predetermined target SOC range. Accordingly, a situation where the SOC of the battery becomes lower than the lower limit value of the predetermined target SOC range before the completion of the reduction of NOx in the NSR catalyst is suppressed from occurring. With this, the driving of the electric motor is suppressed from being stopped, and the engine rotation speed of the internal combustion engine is suppressed from rising, or the operation of the internal combustion engine is suppressed from being resumed, in a state where unreacted fuel exists in the NSR catalyst. For that reason, it is possible to suppress the unreacted fuel from flowing out from the NSR catalyst in accompany with the rise of the engine rotation speed of the internal combustion engine or resumption of the operation thereof. Accordingly, according to the present disclosure, the deterioration of the exhaust gas components can be suppressed.

According to the present disclosure, in cases where an NSR catalyst is arranged in an exhaust passage of an internal combustion engine in a hybrid vehicle, it is possible to compatibly achieve suppression of an amount of fuel consumed for reducing NOx stored in the NSR catalyst and suppression of deterioration in exhaust gas components due to unreacted fuel flowing out from the NSR catalyst.

DESCRIPTION OF THE EMBODIMENTS

Hereinafter, specific modes (an embodiment and its modifications) of the present disclosure will be described based on the attached drawings. However, the dimensions, materials, shapes, relative arrangements and so on of component parts described in the embodiment and its modifications are not intended to limit the technical scope of the present disclosure to these alone in particular as long as there are no specific statements.

Embodiment (Schematic Construction of Hybrid System and Intake and Exhaust Systems of Internal Combustion Engine)

Figure 1:
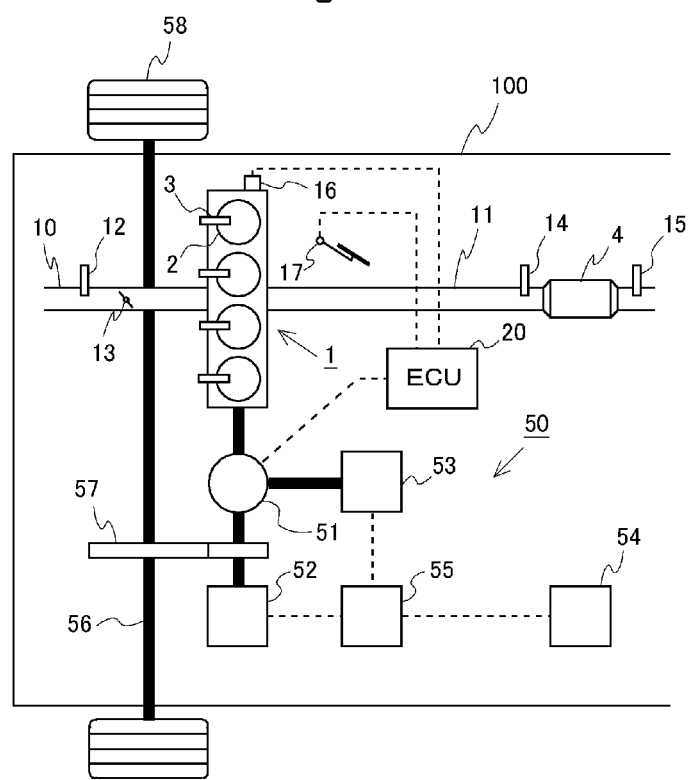
FIG. 1 is a view indicating the schematic construction of a hybrid system and intake and exhaust systems of an internal combustion engine according to an embodiment.

FIG. 1 is a view showing the schematic construction of a hybrid system and intake and exhaust systems of an internal combustion engine according to an embodiment. A hybrid system 50 mounted on a vehicle 100 is provided with an internal combustion engine 1, a power dividing mechanism 51, an electric motor 52, a generator 53, a battery 54, an inverter 55, and a reduction gear 57. The reduction gear 57 is connected to an axle 56 of the vehicle 100. Wheels 58 are connected to the opposite ends of the axle 58, respectively.

The power dividing mechanism 51 serves to divide an output from the internal combustion engine 1 to the generator 53 and the axle 56. Then, this generator 53 generates electricity by the power outputted by the internal combustion engine 1. The power dividing mechanism 51 also has a function to transmit an output from the electric motor 52 to the axle 56. The electric motor 52 rotates at a rotation speed proportional to the rotation speed of the axle 56 through the reduction gear 57. In addition, the battery 54 is connected to the electric motor 52 and the generator 53 through the inverter 55.

The inverter 55 converts direct current power supplied from the battery 54 to alternating current power, and supplies it to the electric motor 52. In addition, the inverter 55 converts alternating current power supplied from the generator 53 to direct current power, and supplies it to the battery 54. In this manner, charging of the battery 54 is carried out.

In the hybrid system 50 constructed as mentioned above, the axle 56 is caused to rotate by the output of the internal combustion engine 1, or the output of the electric motor 52. In addition, the axle 56 can also be caused to rotate with the output of the internal combustion engine 1 and the output of the electric motor 52 combined together. In other words, the electric motor 52 and the internal combustion engine 1 can also be used together as sources of power of the vehicle 100. Moreover, a crankshaft of the internal combustion engine 1 can also be caused to rotate by the output of the electric motor 52. In other words, only the electric motor 52 can also be used as a source of power of the vehicle 100. Further, at the time of deceleration of the vehicle 100, kinetic energy can be converted to electrical energy which can also be recovered by the battery 54, by making the electric motor 52 act as a generator by means of the rotational force of the axle 56.

The internal combustion engine 1 is a diesel engine. The internal combustion engine 1 has four cylinders 2. Each of the cylinders 2 is provided with a fuel injection valve 3 that directly injects fuel into the cylinder 2. Here, note that the internal combustion engine related to the present disclosure is not limited to a diesel engine, but may be a gasoline engine which performs lean burn operation. An intake passage 10 and an exhaust passage 11 are connected to the internal combustion engine 1. In the intake passage 10, there are arranged an air flow meter 12 and a throttle valve 13. The air flow meter 12 serves to detect an amount of intake air sucked into the internal combustion engine 1. The throttle valve 13 serves to adjust the amount of intake air sucked into the internal combustion engine 1.

An NSR catalyst 4 is arranged in the exhaust passage 11 of the internal combustion engine 1. An air fuel ratio sensor 14 is arranged in the exhaust passage 11 at the upstream side of the NSR catalyst 4. Moreover, an exhaust gas temperature sensor 15 is arranged in the exhaust passage 11 at the downstream side of the NSR catalyst 4. The air fuel ratio sensor 14 detects an air fuel ratio of the exhaust gas flowing into the NSR catalyst 4 (hereinafter, sometimes also referred to simply as an "incoming exhaust gas"). The exhaust gas temperature sensor 15 detects a temperature of the exhaust gas which flows out from the NSR catalyst 4.

In addition, the hybrid system 50 is provided with an electronic control unit (ECU) 20. The air flow meter 12, the air fuel ratio sensor 14, and the exhaust gas temperature sensor 15 are electrically connected to the ECU 20. Moreover, a crank angle sensor 16 and an accelerator opening sensor 17 are electrically connected to the ECU 20. The crank angle sensor 16 detects a crank angle of the internal combustion engine 1. The accelerator opening sensor 17 detects a degree of opening of an accelerator of the vehicle 100. Then, the output values of these sensors are inputted to the ECU 20. The ECU 20 calculates the engine rotation speed of the internal combustion engine 1 based on the output value of the crank angle sensor 11. In addition, the ECU 20 calculates a required torque, which is a torque required as a driving force of the vehicle 100, based on the output value of the accelerator opening sensor 17.

Moreover, during the operation of the internal combustion engine 1, the ECU 20 estimates a flow rate of the incoming exhaust gas based on the detected value of the air flow meter 12 and an amount of fuel injection from each of the fuel injection valves 3. In addition, the ECU 20 estimates a temperature of the NSR catalyst 4 based on the output value of the exhaust gas temperature sensor 15. Further, the ECU 20 estimates an SOC of the battery 54 by integrating, whenever necessary, an amount of electric energy supplied to the battery 54 (an amount of electric energy or power generated by the generator 53 or the electric motor 52) and an amount of electric energy released from the battery 54 (an amount of electric energy or power consumed for the driving of the electric motor 52). In addition, the electric motor 52, the power dividing mechanism 51, the fuel injection valves 3 and the throttle valve 13 are electrically connected to the ECU 20. Then, these parts are controlled by means of the ECU 20. For example, the ECU 20 adjusts the amount of electric energy or power generated by the generator 53 by controlling the output of the internal combustion engine 1 so that the SOC of the battery 54 is maintained within a predetermined target SOC range. Here, note that the predetermined target SOC range has been set in advance as a suitable range of the SOC for the battery 54, based on experiments, etc.

(NOx Reduction Processing)

Further, during the operation of the internal combustion engine 1, the ECU 20 estimates, whenever necessary, a storage amount of NOx in the NSR catalyst 4 based on the amount of fuel injection from each fuel injection valve 3, the flow rate of the incoming exhaust gas, the air fuel ratio of the incoming exhaust gas, the temperature of the NSR catalyst 4, etc. Then, in this embodiment, when the storage amount of NOx estimated by the ECU 20 reaches a predetermined storage amount, the ECU 20 carries out NOx reduction processing so as to recover the NOx storage capacity of the NSR catalyst 4. The NOx reduction processing is achieved by performing auxiliary fuel injection by means of each fuel injection valve 3 in addition to main fuel injection carried out at a time in the vicinity of compression top dead center in each cylinder 2 of the internal combustion engine 1, thereby supplying fuel as a reducing agent to the NSR catalyst 4. Here, note that the auxiliary fuel injection herein is fuel injection which is carried out at a time which is after the main fuel injection during one combustion cycle, and at which injected fuel is not used for combustion within a cylinder 2 contributing to an engine output. An amount of auxiliary fuel injection is adjusted so that the air fuel ratio in the NSR catalyst 4 becomes a rich air fuel ratio at which the NOx stored in the NSR catalyst 4 can be reduced. In addition, the predetermined storage amount has been decided in advance based on experiments, etc., as a threshold value of the storage amount of NOx at which the recovery of the NOx storage capacity of the NSR catalyst 4 should be carried out.

In addition, in this embodiment, the ECU 20 carries out predetermined power source control in accompany with the execution of the NOx reduction processing. In the predetermined power source control according to this embodiment, the operation of the internal combustion engine 1 is made to stop, and the electric motor 52 is controlled so as to compensate for the required torque. The ECU 20 stops the operation of the internal combustion engine 1, after supplying a predetermined supply amount of fuel to the NSR catalyst 4 by carrying out the auxiliary fuel injection in addition to the main fuel injection in each cylinder 2. Here, note that the operation stop of the internal combustion engine 1 herein is to make the engine rotation speed to zero by stopping the fuel injection from each fuel injection valve 3. Then, the ECU 20 compensates for the required torque according to the degree of opening of the accelerator by driving the electric motor 52. In other words, the ECU 20 controls the electric motor 52 so that the required torque is generated by the electric motor 52 alone.

In addition, in this embodiment, the predetermined supply amount, which is a total amount of fuel as the reducing agent supplied to the NSR catalyst 4 in the NOx reduction processing, is set as an amount of fuel necessary and sufficient for reducing the predetermined storage amount of NOx stored in the NSR catalyst 4 under the state where the internal combustion engine 1 has been stopped. Here, in cases where the predetermined power source control is carried out in accompany with the execution of the NOx reduction processing as mentioned above, the operation of the internal combustion engine 1 is stopped after fuel is supplied to the NSR catalyst 4, whereby new exhaust gas stops flowing into the NSR catalyst 4. In that case, in comparison with the case where the operation of the internal combustion engine 1 is continued even after fuel is supplied to the NSR catalyst 4, an amount of oxygen to be supplied to the NSR catalyst 4 decreases, and further, an amount of heat to be carried away from the NSR catalyst 4 by the exhaust gas also decreases. For that reason, it becomes possible to reduce the NOx stored in the NSR catalyst in a more efficient manner, in comparison with the case where the operation of the internal combustion engine 1 is continued even after fuel is supplied to the NSR catalyst 4, i.e., the case where the NOx reduction processing is carried out without performing the predetermined power source control. Accordingly, it becomes possible to reduce the predetermined storage amount of NOx with a smaller amount of fuel. For that reason, the predetermined supply amount in the NOx reduction processing in the case where the predetermined power source control is carried out in accompany with the execution of the NOx reduction processing has been decided in advance based on experiments, etc., in consideration of such matters.

Here, based on a time chart shown in FIG. 2, an explanation will be made of an example of the changes over time of a storage amount of NOx in the NSR catalyst, an SOC of the battery, an amount of fuel supplied per unit time to the NSR catalyst (hereinafter, sometimes also referred to as a "unit fuel supply amount"), an air fuel ratio in the NSR catalyst (hereinafter, sometimes also referred to as an "NSR air fuel ratio"), an engine rotation speed of the internal combustion engine, and an amount of HC flowing out from the NSR catalyst (hereinafter, sometimes also referred to as an "outflow amount of HC"), at the time when the NOx reduction processing and the predetermined power source control are carried out. Qnox1 in the storage amount of NOx (the storage amount of NOx in the NSR catalyst 4) in the time chart shown in FIG. 2 indicates the predetermined storage amount. In addition, A/Fth in the NSR air fuel ratio in the time chart shown in FIG. 2 indicates a stoichiometric air fuel ratio. Moreover, in the SOC (the SOC of the battery 54) in FIG. 2, C1 indicates a lower limit value of the predetermined target SOC range (hereinafter, sometimes also referred to as an "SOC lower limit value"), and C2 indicates an upper limit value of the predetermined target SOC range. Further, in the SOC in FIG. 2, Cth indicates a predetermined state of charge. The predetermined state of charge Cth is a value which is larger than the SOC lower limit value C1 and which is smaller than the upper limit value C2 of the predetermined target SOC range. Here, note that FIG. 2 shows the change over time of each parameter at the time when the required torque according to the accelerator opening degree falls in a region in which the internal combustion engine 1 is generally used as a source of power of the vehicle 100 (i.e., a region where the electric motor 52 is stopped).

Figure 2:
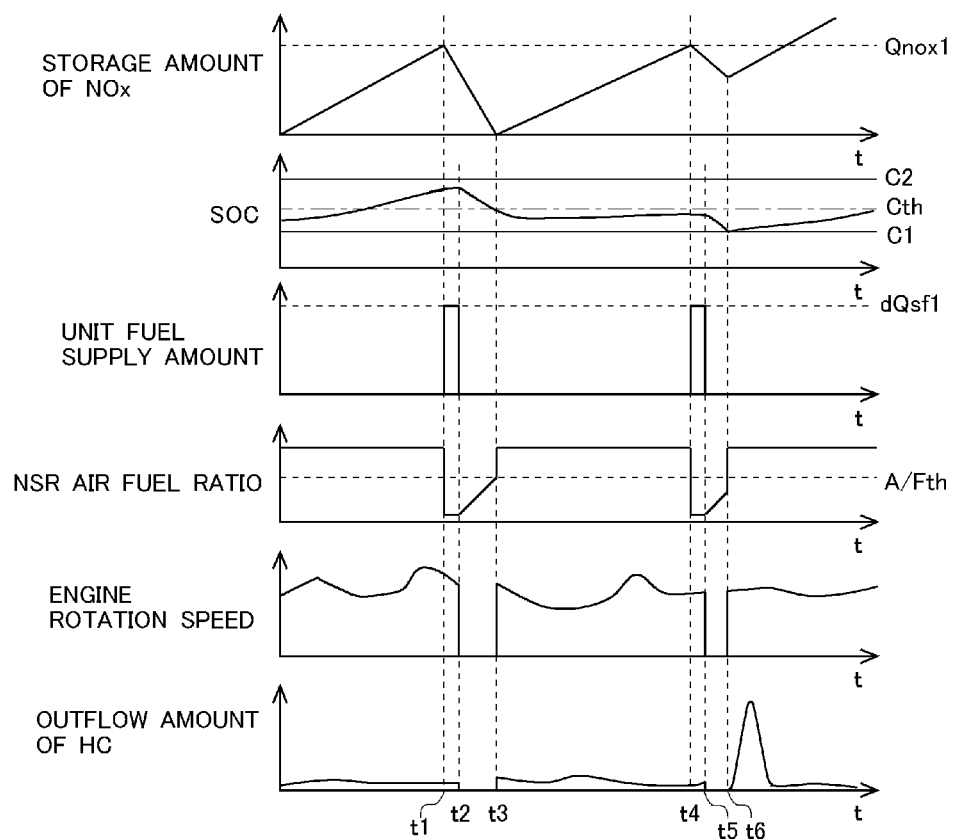
FIG. 2 is a time chart indicating an example of the changes over time of a storage amount of NOx in an NSR catalyst, an SOC of a battery, an amount of fuel supplied per unit time to the NSR catalyst, an air fuel ratio in the NSR catalyst, a engine rotation speed of the internal combustion engine, and an outflow amount of HC from the NSR catalyst at the time when NOx reduction processing is carried out.

In FIG. 2, at time t1, the storage amount of NOx in the NSR catalyst 4 reaches the predetermined storage amount Qnox1. For that reason, the NOx reduction processing is carried out so as to reduce the NOx stored in the NSR catalyst 4. In other words, at the time t1, the supply of fuel to the NSR catalyst 4 by carrying out auxiliary fuel injection in addition to main fuel injection in each cylinder 2 is started. As a result of this, the NSR air fuel ratio becomes a rich air fuel ratio. In that case, NOx begins to be reduced in the NSR catalyst 4, so from the time t1, the storage amount of NOx in the NSR catalyst 4 begins to decrease. Here, note that, as shown in FIG. 2, the SOC of the battery 54 at time t2 is equal to or more than the predetermined state of charge Cth. Thereafter, at the time t2, when a total of the amount of fuel supply to the NSR catalyst 4 after the time t1 reaches the predetermined supply amount, predetermined power source control is carried out. In other words, at the time t2, the operation of the internal combustion engine 1 is stopped, and the engine rotation speed of the internal combustion engine 1 becomes zero. Here, with this, the supply of fuel to the NSR catalyst 4 is also stopped. Moreover, at the time t2, the control of the electric motor 52 for compensating for the required torque according to the accelerator opening degree is started. For that reason, the electric power of the battery 54 begins to be consumed by the driving of the electric motor 52, so from the time t2, the SOC of the battery 54 begins to decrease. Then, at time t3, the storage amount of NOx in the NSR catalyst 4 becomes zero, i.e., the reduction of NOx in the NSR catalyst 4 is completed.

At this time, at the time t3, almost all of the fuel supplied to the NSR catalyst 4 in a period of time from the time t1 to the time t2 has been consumed for the reduction of NOx. In other words, at the time t3, unreacted fuel does not substantially exist in the NSR catalyst 4. For that reason, at the time t3, the NSR air fuel ratio becomes a value in the vicinity of the stoichiometric air fuel ratio A/Fth. Then, when the reduction of NOx in the NSR catalyst 4 is completed at the time t3, the execution of the predetermined power source control is stopped. In other words, at the time t3, the driving of the electric motor 52 is stopped, and at the same time, the operation of the internal combustion engine 1 is resumed. Here, note that the time of completion of the reduction of NOx in the NSR catalyst 4 and the time of stop of the execution of the predetermined power source control (i.e., the time of resumption of the operation of the internal combustion engine 1) may not necessarily be simultaneous. In other words, after the reduction of NOx in the NSR catalyst 4 is completed, the execution of the predetermined power source control may be stopped.

Here, in a period of time from the time t2 to the time t3 during which the predetermined power source control is carried out, the electric motor 52 is driven in order to compensate for the required torque, so the SOC of the battery 54 will decrease. However, as shown in FIG. 2, even at the time t3, the SOC of the battery 54 is maintained equal to or more than the SOC lower limit value C1. This is because the SOC of the battery 54 at the time t2 is equal to or more than the predetermined state of charge Cth. In other words, the reason is that when the driving of the electric motor 52 for compensating the required torque is started, the battery 54 is in a sufficiently charged state.

Then, in FIG. 2, after the operation of the internal combustion engine 1 has been resumed at the time t3, the storage amount of NOx in the NSR catalyst 4 reaches again the predetermined storage amount Qnox1 at time t4. For that reason, in a period of time from the time t4 to time t5, similar to the period of time from the time t1 to the time t2, auxiliary fuel injection is carried out in each cylinder 2, so that the predetermined supply amount of fuel is thereby supplied to the NSR catalyst 4. Then, at the time t5, when a total of the amount of fuel supply to the NSR catalyst 4 after time t4 reaches the predetermined supply amount, the predetermined driving source control is carried out again. At this time, at the time t5, unlike at the time t2, the SOC of the battery 54 is smaller than the predetermined state of charge Cth. Therefore, after the execution of the predetermined power source control is started at the time t5 (in other words, after the control of the electric motor 52 for compensating for the required torque is started), at time t6 before the storage amount of NOx in the NSR catalyst 4 becomes substantially zero, i.e., before the reduction of NOx in the NSR catalyst 4 is completed, the SOC of the battery 54 will decrease up to the SOC lower limit value C1. In that case, in order to maintain the SOC of the battery 54 within the predetermined target SOC range, at time t6, the execution of the predetermined power source control will be stopped, in other words, the driving of the electric motor 52 is stopped, and the operation of the internal combustion engine 1 is resumed.

In this case, at the point in time t6, unreacted fuel remains in the NSR catalyst 4, and hence, the operation of the internal combustion engine 1 is resumed in a state where the unreacted fuel exists in the NSR catalyst 4. In that case, exhaust gas flows into the NSR catalyst 4, and the unreacted fuel existing in the NSR catalyst 4 flows out from the NSR catalyst 4 together with the exhaust gas. For that reason, in FIG. 2, immediately after the time t6, an outflow amount of HC, a part of the unreacted fuel, flowing out from the NSR catalyst 4 increases to a large extent.

In this manner, in cases where the predetermined power source control is carried out in accompany with the execution of the NOx reduction processing, when the SOC of the battery 54 becomes less than the SOC lower limit value C1 before the reduction of NOx in the NSR catalyst 4 is completed, it becomes necessary to resume the operation of the internal combustion engine 1 before the reduction of NOx is completed. Then, in such a case, because the unreacted fuel flows out from the NSR catalyst 4, there is a fear that a deterioration in exhaust gas components may be caused.

Thus, in this embodiment, when the predetermined power source control is carried out in accompany with the execution of the NOx reduction processing, during the period of execution of the predetermined power source control, the SOC lower limit value is changed to a value smaller than at times other than the period of execution of the predetermined power source control. According to this, even if the SOC of the battery 54 decreases during the period of execution of the predetermined power source control, it becomes difficult for the SOC of the battery 54 to reach the SOC lower limit value. Accordingly, a situation where the SOC of the battery 54 becomes lower than the SOC lower limit value before the completion of the reduction of NOx in the NSR catalyst 4 is suppressed from occurring.

(Flow for NOx Reduction Processing)

Figure 3:
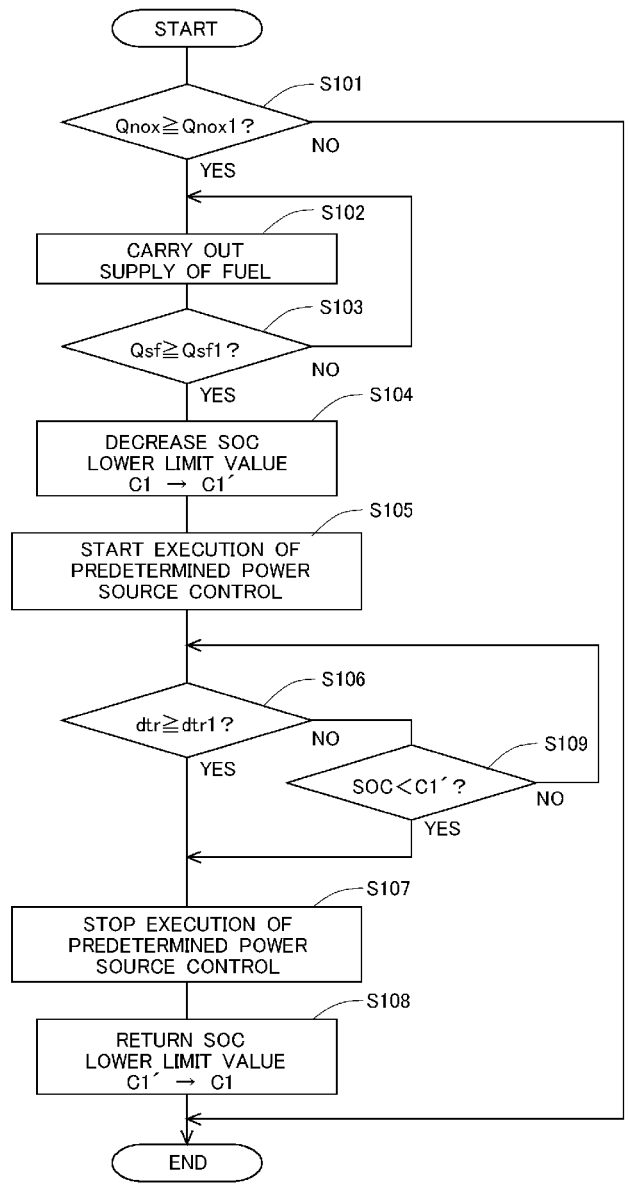
FIG. 3 is a flow chart indicating a flow of the NOx reduction processing according to this embodiment.

Hereinafter, reference will be made to a flow or routine for the NOx reduction processing according to this embodiment, based on a flow chart shown in FIG. 3. This flow or routine is achieved by a program which has been beforehand stored in the ECU 20, and which is executed by the ECU 20.

The execution of this flow or routine is started during the operation of the internal combustion engine 1. As mentioned above, during the operation of the internal combustion engine 1, the storage amount of NOx in the NSR catalyst 4 is estimated by the ECU 20 as required. Then, in step S101 of this routine, it is determined whether the storage amount of NOx Qnox in the NSR catalyst 4 estimated by the ECU 20 has become equal to or more than the predetermined storage amount Qnox1. Here, note that in this embodiment, a state where the storage amount of NOx Qnox in the NSR catalyst 4 reaches the predetermined storage amount Qnox1 corresponds to a "predetermined NOx reduction execution condition" according to the present disclosure. However, the "predetermined NOx reduction execution condition" according to the present disclosure is not limited to this. For example, in cases where the NOx reduction processing is made to be carried out whenever an integrated value of the amount of fuel injection in the internal combustion engine 1 reaches a predetermined threshold value, the NOx reduction execution condition may also be that the integrated value of the amount of fuel injection in the internal combustion engine 1 from the end time of the execution of the last NOx reduction processing reaches a predetermined threshold value. In addition, in a construction that an NOx sensor is arranged in the exhaust passage 11 at the downstream side of the NSR catalyst 4, the NOx reduction execution condition may also be that an output value of the NOx sensor reaches a predetermined threshold value. Moreover, whether the NOx reduction execution condition is satisfied may be determined in consideration of the temperature of the NSR catalyst 4 or the flow rate of the incoming exhaust gas.

In cases where a negative determination is made in step S101, the execution of this routine is once ended. On the other hand, in cases where an affirmative determination is made in step S101, the processing of step S102 is then carried out. In step S102, the NOx reduction processing is carried out. In other words, the supply of fuel to the NSR catalyst 4 is carried out by performing auxiliary fuel injection in addition to main fuel injection in each cylinder 2. Subsequently, in step S103, it is determined whether a total of the amount of fuel supply Qsf to the NSR catalyst 4 after the current supply of fuel to the NSR catalyst 4 is started (i.e., from the start of the execution of the auxiliary fuel injection) becomes equal to or more than a predetermined supply amount Qsf1. In cases where a negative determination is made in step S103, the processing of the step S102 is carried out again. In other words, the supply of fuel to the NSR catalyst 4 is continued. On the other hand, in cases where an affirmative determination is made in step S103, the processing of step S104 is then carried out.

In step S104, the SOC lower limit value is decreased from C1 to C1'. In other words, the predetermined power source control has not been carried out until an affirmative determination is made in step S103, so the SOC lower limit value has been set to C1 as shown in FIG. 2. Then, when an affirmative determination is made in step S103, then in step S104, the set value of the SOC lower limit value is changed to C1' which is smaller than C1. Here, note that C1 and C1' are each value which have been decided in advance in consideration of the performance of the battery 54.

Subsequently, in step S105, the execution of the predetermined power source control is started. In other words, the operation of the internal combustion engine 1 is stopped, and at the same time, control of the electric motor 52 for compensating for the required torque is carried out. Then, in step S106, it is determined whether a period of time dtr elapsed after the supply of fuel to the NSR catalyst 4 in step S102 is started (i.e., the length of a period of time in which the reduction of NOx is carried out in the NSR catalyst 4) becomes equal to or more than a predetermined period of time dtr1. Here, the predetermined period of time dtr1 has been set in advance based on experiments, etc., as a period of time sufficient for the reduction of NOx in the NSR catalyst 4 to be completed, when the predetermined power source control is carried out together with the NOx reduction processing. Here, note that the rate of reduction of NOx in the NSR catalyst 4 changes according to the temperature of the NSR catalyst 4. For that reason, the predetermined period of time dtr1 may be set based on the temperature of the NSR catalyst 4 at the start of the execution of the NOx reduction processing. Moreover, the change over time of the temperature of the NSR catalyst 4 after the execution of the NOx reduction processing may be predicted, and the predetermined period of time dtr1 may also be set in consideration of a predicted value of the change over time of the temperature thus obtained.

In cases where a negative determination is made in step S106, it can be judged that the reduction of NOx continues in the NSR catalyst 4. In this case, the processing of step S109 is then carried out. In step S109, it is determined whether the SOC of the battery 54 is smaller than the SOC lower limit value C1' set in step S104. In cases where a negative determination is made in step S109, it can be judged that the predetermined power source control is able to be continued. In this case, the processing of step S106 is carried out again. On the other hand, in cases where an affirmative determination is made in step S109, then in step S107, the execution of the predetermined power source control is stopped. In other words, the driving of the electric motor 52 is stopped, and at the same time, the operation of the internal combustion engine 1 is resumed. In this case, the operation of the internal combustion engine 1 is resumed in the state where the reduction of NOx is not completed in the NSR catalyst 4. However, a probability that the SOC of the battery 54 is less than the SOC lower limit value C1' during the execution of the predetermined power source control (i.e., a probability that an affirmative determination is made in step S109) of course becomes lower than a probability that the SOC of the battery 54 is less than the SOC lower limit value C1 before change.

In addition, in cases where an affirmative determination is made in step S106, it can be judged that the reduction of NOx has been completed in the NSR catalyst 4 before the SOC of the battery 54 becomes less than the SOC lower limit value C1'. In this case, too, then in step S107, the execution of the predetermined power source control is stopped. However, in this case, the operation of the internal combustion engine 1 is resumed in a state where the reduction of NOx has been completed in the NSR catalyst 4. After the step S107, the SOC lower limit value is returned from C1' to C1.

Here, note that the above-mentioned flow or routine is carried out, on the premise that the required torque according to the accelerator opening degree falls within a range in which the internal combustion engine 1 is used as a source of power of the vehicle 100. Accordingly, for example, in cases where at the time when an affirmative determination is made in step S106, the required torque according to the accelerator opening degree has shifted to a region in which only the electric motor 52 is used as a source of power of the vehicle 100, the driving of the electric motor 52 is continued without carrying out the processing of step S107, while the operation of the internal combustion engine 1 is stopped.

Next, an example of the changes over time of the storage amount of NOx in the NSR catalyst, the SOC of the battery, the amount of fuel supplied per unit time to the NSR catalyst, the NSR air fuel ratio, the engine rotation speed of the internal combustion engine, and the outflow amount of HC flowing out from the NSR catalyst, at the time when the NOx reduction processing is carried out based on the flow or routine shown in FIG. 3 will be explained based on a time chart shown in FIG. 4. Here, note that, similar to FIG. 2, FIG. 4 also shows the changes over time of the above individual parameters, when the required torque according to the accelerator opening degree falls within a range in which the internal combustion engine 1 is used as a source of power of the vehicle 100.

Figure 4:
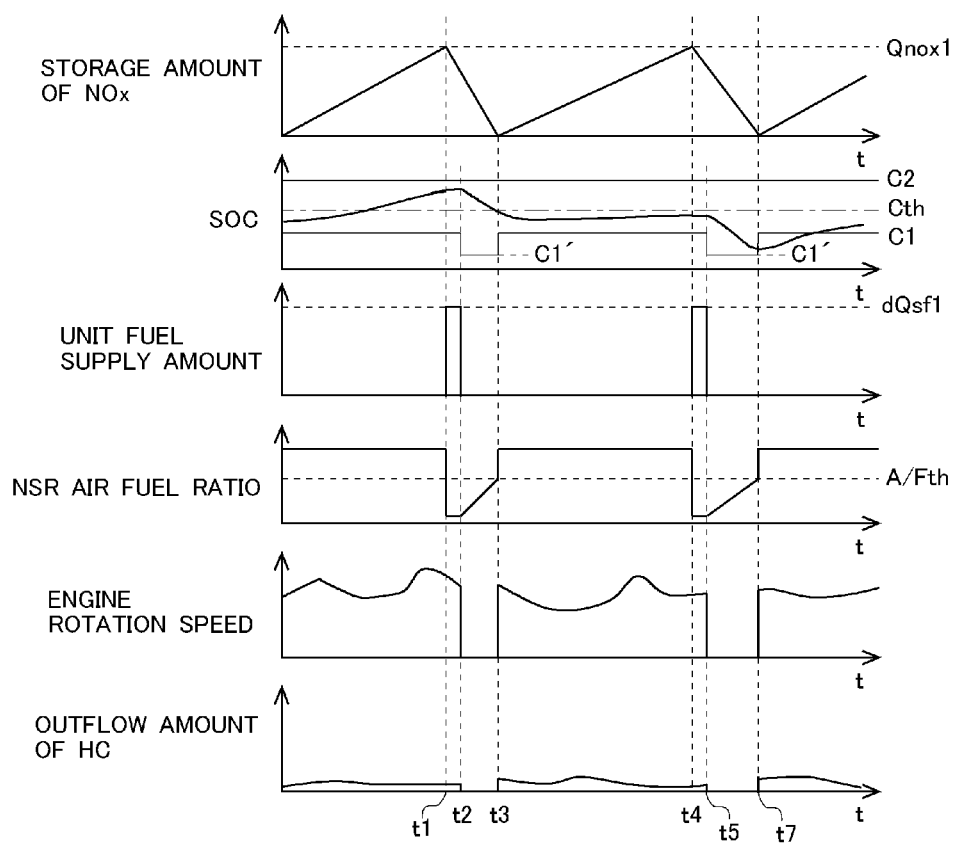
FIG. 4 is a time chart indicating an example of the changes over time of the storage amount of NOx in the NSR catalyst, the SOC of the battery, the amount of fuel supplied per unit time to the NSR catalyst, the air fuel ratio in the NSR catalyst, the engine rotation speed of the internal combustion engine, and the outflow amount of HC from the NSR catalyst at the time when the NOx reduction processing is carried out based on the flow shown in FIG. 3.

In the time chart shown in FIG. 4, too, the value of each parameter changes, as in the time chart shown in FIG. 2, before time t5. However, in a period of time from time t2 to time t3, the predetermined power source control is carried out, so the SOC lower limit value is decreased to C1'. Then, in FIG. 4, when the predetermined power source control is carried out again at the time t5, the SOC lower limit value is decreased again from C1 to C1'. For that reason, even if the SOC of the battery 54 is less than C1 which is the SOC lower limit value before change (i.e., the SOC lower limit value at times other than the period of execution of the predetermined power source control) during the execution of the predetermined power source control after the time t5, the execution of the predetermined power source control is continued. Then, at time t7, when the storage amount of NOx in the NSR catalyst 4 becomes zero, i.e., when the reduction of NOx in the NSR catalyst 4 is completed, the execution of the predetermined power source control is stopped. Also, at the time t7, the SOC lower limit value is returned from C1' to C1.

In this case, even if the SOC of the battery 54 at the time t5 is smaller than the predetermined state of charge Cth, almost all of the fuel supplied to the NSR catalyst 4 in a period of time from the time t4 to the time t5 has been consumed for the reduction of NOx, when the operation of the internal combustion engine 1 is resumed at time t7. In other words, at the time t7, unreacted fuel does not substantially exist in the NSR catalyst 4. For that reason, at the time t7, the NSR air fuel ratio becomes a value in the vicinity of the stoichiometric air fuel ratio A/Fth, similar to the time t3. In other words, even if the execution of the predetermined power source control is started in a state where the SOC of the battery 54 is smaller than the predetermined state of charge Cth, the operation of the internal combustion engine 1 can be resumed in a state where unreacted fuel does not substantially exist in the NSR catalyst 4. Accordingly, immediately after the time t7, a steep or large increase in the outflow amount of HC from the NSR catalyst 4 as shown immediately after the time t6 in FIG. 2 does not occur.

As described above, in this embodiment, a total amount of fuel (a total of the amount of auxiliary fuel injection) supplied to the NSR catalyst 4 for the reduction of NOx can be decreased by carrying out the predetermined power source control in accompany with the execution of the NOx reduction processing. Accordingly, an amount of fuel to be consumed in order to reduce the NOx stored in the NSR catalyst 4 can be suppressed. Further, in this embodiment, during the period of execution of the predetermined power source control, by changing the SOC lower limit value to a value smaller than at times other than the period of execution of the predetermined power source control, it is possible to suppress the occurrence of a situation where the SOC of the battery 54 becomes lower than the SOC lower limit value before the completion of the reduction of NOx in the NSR catalyst 4. With this, the driving of the electric motor 52 is suppressed from being stopped, and the operation of the internal combustion engine 1 is suppressed from being resumed, in a state where unreacted fuel exists in the NSR catalyst 4. For that reason, it is possible to suppress the unreacted fuel from flowing out from the NSR catalyst 4 in accompany with the resumption of the operation of the internal combustion engine 1. Accordingly, the deterioration of exhaust gas components can be suppressed.

Thus, according to this embodiment, it is possible to make the suppression of the amount of fuel consumed for reducing NOx stored in the NSR catalyst 4 and the suppression of deterioration in the exhaust gas components due to unreacted fuel flowing out from the NSR catalyst 4 compatible with each other.

(First Modification)

Next, reference will be made to a modification of this embodiment. In the above-mentioned embodiment, the explanation has been made by exemplifying a case where the present disclosure is applied to carrying out the NOx reduction processing when only the internal combustion engine 1 is used as a source of power of the vehicle 100. However, the present disclosure can also be applied to carrying out the NOx reduction processing when the internal combustion engine 1 and the electric motor 52 are used together as sources of power of the vehicle 100. In this case, too, when the storage amount of NOx Qnox in the NSR catalyst 4 reaches the predetermined storage amount Qnox1 while using together the internal combustion engine 1 and the electric motor 52 as the sources of power of the vehicle 100, the NOx reduction processing is carried out, and the predetermined power source control is further carried out with the execution of the NOx reduction processing. Then, during the period of execution of the predetermined power source control, the SOC lower limit value is changed to a value smaller than at times other than the period of execution of the predetermined power source control.

(Second Modification)

In addition, in the above-mentioned embodiment, the operation of the internal combustion engine 1 is made to stop in the predetermined power source control. However, in the predetermined driving source control, the operation of the internal combustion engine 1 is not necessarily stopped, but the engine rotation speed of the internal combustion engine 1 may be decreased than at the time of normal operation, while continuing the operation of the internal combustion engine 1. Here, the normal operation is an operating state of the internal combustion engine which has been decided in advance according to the required torque. Here, note that in this case, too, the electric motor 52 is of course controlled so as to compensate for a decrease in the torque accompanying the decrease of the engine rotation speed of the internal combustion engine 1.

In the case where the engine rotation speed of the internal combustion engine 1 is made to decrease, the flow rate of the exhaust gas flowing into the NSR catalyst 4 becomes smaller, in comparison with the case where the operating state of the internal combustion engine 1 is maintained in the normal operation. In that case, the amount of oxygen supplied to the NSR catalyst 4 decreases more in comparison with the case where the operating state of the internal combustion engine is maintained in the normal operation, and further, the amount of heat carried away by the exhaust gas from the NSR catalyst 4 also decreases. Accordingly, even in the case where the engine rotation speed of the internal combustion engine 1 is made to decrease in the predetermined driving source control, it becomes possible to reduce the NOx stored in the NSR catalyst 4 in a more effective manner, in comparison with the case where the operating state of the internal combustion engine 1 is maintained in the normal operation. Here, note that in this case, the predetermined supply amount in the NOx reduction processing is set to an amount at which the predetermined storage amount of NOx can be reduced under the state that the engine rotation speed of the internal combustion engine 1 is made to decrease.

Moreover, in cases where in the predetermined driving source control, the operation of the internal combustion engine 1 is not made to stop, but the engine rotation speed of the internal combustion engine 1 is made to decrease than at the time of the normal operation, the NOx reduction processing may be carried out after the start of execution of the control of the electric motor 52 for ensuring the decrease of the engine rotation speed of the internal combustion engine 1 and the required torque. In other words, after decreasing the engine rotation speed of the internal combustion engine 1, fuel may be supplied to the NSR catalyst 4 by performing auxiliary fuel injection in addition to main fuel injection in each cylinder 2.

(Third Modification)

In addition, in the construction shown in FIG. 1, a fuel addition valve for adding fuel into exhaust gas may further be arranged in the exhaust passage 11 at the upstream side of the NSR catalyst 4. Then, when carrying out the NOx reduction processing, fuel may be supplied to the NSR catalyst 4 by adding the fuel from the fuel addition valve, instead of the above-mentioned auxiliary fuel injection in each cylinder 2. Moreover, a fuel addition valve may be arranged in the exhaust passage 11 at the immediate upstream side of the NSR catalyst 4 so that the fuel added from the fuel addition valve can reach the NSR catalyst 4 even in a state where exhaust gas does not flow in the exhaust passage 11. According to such a construction, even in cases where the operation of the internal combustion engine 1 is made to stop in the predetermined driving source control, the NOx reduction processing can be carried out after the stop of operation of the internal combustion engine 1.

What is claimed is:

1. An exhaust gas purification system for a hybrid vehicle which has, as sources of power, an internal combustion engine performing lean burn operation and an electric motor, and which includes: a generator for generating electricity by power outputted from said internal combustion engine; a battery that is charged by electric power generated by said generator, and supplies the electric power to said electric motor; and a control unit that configured to control an operating state of said internal combustion engine and a driving state of said electric motor;

said exhaust gas purification system comprising:
an NOx storage reduction catalyst that is arranged in an exhaust passage of said internal combustion engine,
wherein said control unit is configured to obtain a state of charge of said battery,
wherein said control unit is configured to control said generator to generate electricity by controlling the operating state of said internal combustion engine so that the state of charge of said battery is maintained within a predetermined target SOC range having a nominal upper limit value and a nominal lower limit value, and
wherein said control unit is further configured to
determine if a predetermined NOx reduction execution condition is satisfied,
carry out NOx reduction processing to reduce NOx stored in said NOx storage reduction catalyst by supplying fuel as a reducing agent to said NOx storage reduction catalyst when the predetermined NOx reduction execution condition is satisfied; and
change a lower limit value of said predetermined target SOC range from the nominal lower limit value to a predetermined smaller lower limit value, the predetermined smaller lower limit value being smaller than the nominal lower limit value,
start execution of a predetermined power source control, in which an engine rotation speed of said internal combustion engine is made to decrease, or an operation of said internal combustion engine is made to stop, and said electric motor is controlled so as to compensate for required torque in accompany with the execution of said NOx reduction processing,
during a period of execution of said predetermined power source control, compare the state of charge of said battery with the predetermined smaller lower limit value,
stop execution of the predetermined power source control when the state of charge of said battery is greater than the predetermined smaller lower limit value, and
return the lower limit value to the nominal lower limit value from the predetermined smaller lower limit value.

2. The exhaust gas purification system according to claim 1, wherein the control unit is configured to stop execution of the predetermined power source control when the period of execution of said predetermined power source control is greater than a predetermined time period.

3. The exhaust gas purification system according to claim 1, wherein the predetermined NOx reduction execution condition is when a storage amount of NOx in the NOx storage reduction catalyst is greater than or equal to a predetermined storage amount.

* * * * *